April 5, 1949.  F. RIEBER  2,466,327
DAMPING DEVICE
Filed May 19, 1944

INVENTOR.
FRANK RIEBER
BY
Willis B. Rice

Patented Apr. 5, 1949

2,466,327

UNITED STATES PATENT OFFICE 2,466,327

DAMPING DEVICE

Frank Rieber, New York, N. Y., assignor to Interval Instruments, Inc., New York, N. Y., a corporation of New York Application May 19, 1944, Serial No. 536,406

6 Claims. (Cl. 188—1)

1

This invention relates to a damping mechanism for continuously damping rotary motion.

It is an object of this invention to provide a mechanism which will be simple in construction and which will afford a steady and reliable degree of damping which will not vary with the age or use of the device.

It is a further object to provide a device in which the damping may be adjusted at will and which will maintain each adjustment without variation.

It is a further object to provide a device which in some of its embodiments may be adjusted while in operation.

Many systems have been proposed for damping motion of a rotary part, but they have possessed serious limitations. Where it has been proposed to provide a friction between solid surfaces, difficulty has been experienced in maintaining that friction uniform, since it is very responsive to changes in the character of the surface, the presence or absence of dirt or of lubricant between the surfaces. The control of such a friction by a centrifugal governor has introduced complications which are not desirable.

It has also been proposed to employ fluid pumps operating under a resistance, such for example as that of a liquid passing through a small orifice, but such mechanisms have been liable to get out of repair and it has been difficult to avoid leakage and to maintain uniform characteristics. Where it has been proposed to use paddle wheels rotating in a liquid, difficulty is experienced with leakage and it has been difficult to get a simple means of adjustment.

It is an object of this invention to overcome these difficulties and to secure a smooth and continuous friction without packing troubles. It is a further object to provide a device which will afford a flexible adjustment which may be made during the rotation of the device.

It is a further object to secure a relatively large damping with a small mechanism.

The invention accordingly comprises a device possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which.

Figures 1, 2:
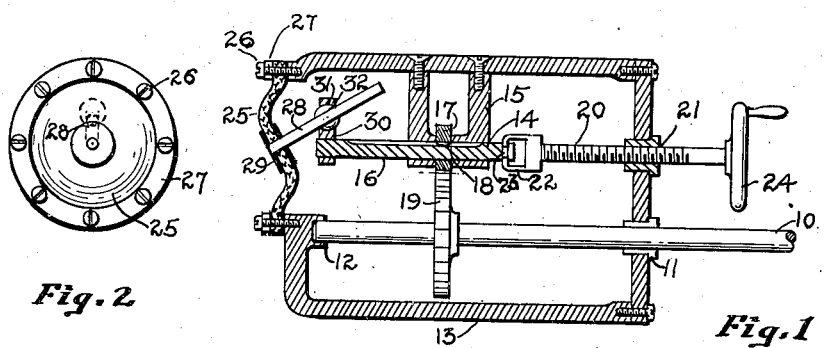
Fig. 1 is a central section through a device embodying this invention.
Fig. 2 is an end elevation of the diaphragm portion of the mechanism of Fig. 1.

Referring now to Fig. 1 of the drawings, numeral 10 designates the shaft whose motion is to be damped, which is carried in bearings 11 and 12 in a frame 13. Mounted parallel to the shaft 10 in a bearing 14 in a bracket 15, carried by the frame 13, is a shaft 16. This shaft is rotatable by a pinion 17 splined to the shaft 16 by a spline 18. This pinion meshes with a gear 19 upon the shaft 10. It will ordinarily be desirable to make the pinion 17 smaller than the gear 19 to increase the amount of damping.

A screw 20 working in a nut 21 in the frame 13 is in alignment with the shaft 16 and carries at its end fingers 22 fitting within a circumferential slot 23 in the end of the shaft 16 to permit rotation of the shaft 16 relative to the screw 20, and at the same time to permit the screw 20 to adjust the position of the shaft 16 longitudinally. A hand wheel 24 may be provided on the screw 20 to facilitate this adjustment.

Mounted upon the frame 13 coaxial with the shaft 16 is a flexible diaphragm 25 which may be held in place upon the frame by a ring 27, held by screws 26. Centrally disposed in this diaphragm and perpendicular to its surface is a rod 28. This rod may be held in place in the diaphragm in any suitable manner; as shown, washers 29 are held on both sides of the central portion of the diaphragm by the rod.

Mounted on the outer end of the shaft 16 and extending laterally therefrom is an arm 30 having a ball socket 31 carrying a ball 32. This ball has a bore diametrically through it to receive the rod 28, so that as the shaft 16 revolves, there is a nutation of the rod around the axis of the shaft.

With the above construction it will be clear that the diaphragm 25 is flexed out of alignment, as clearly shown in Fig. 1, and that as the shaft 10 is rotated, the plane of flexure rotates with the shaft 16. The damping action occasioned by this device results from the internal friction of the diaphragm 25 during this nutation. Any suitable material may be used for this diaphragm, depending upon the degree of damping required, but some of the modern materials give a very high and constant degree of internal viscosity and therefore make possible a very considerable damping in small space. Suitable materials for such purpose may be found among the recently developed synthetic rubbers and rubberlike compounds, for example, the material which is manufactured and is available on the market under the trade name of "Viscoloid." That material offers a high internal resistance and at the same time it may be subjected to extensive usage without deterioration, and it does not materially change its constants during use.

If it is desired to alter the degree of damping, this may readily be accomplished by screwing the hand wheel 24, thereby altering the longitudinal position of the shaft 16 and the arm 30. This changes the angle of the rod, and hence changes the degree of deformation of the diaphragm for each rotation, and correspondingly changes the amount of damping.

It will be clear in the foregoing description that in all of these embodiments there is no rotation of the rod 28 or 45 relative to the diaphragm. This is particularly important in the modifications of Figs. 5 to 8, as it means that there is no bearing between the rod and the diaphragm, and hence the fluid chambers are completely closed without danger of leakage.

Figures 5, 6:
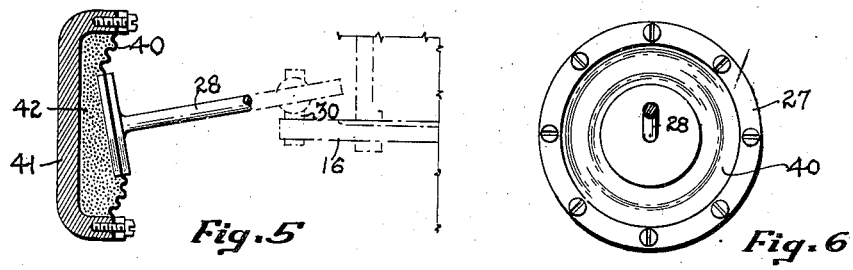
Fig. 5 is a fragmentary section showing a modification of the damping element applicable to the construction of Fig. 1.
Fig. 6 is a side elevation of the construction of Fig. 5.

In the construction disclosed in Fig. 1, the diaphragm 25 operates with air on both its faces, relying upon the internal friction of the diaphragm alone. In the construction of Fig. 5, the other parts being the same, the diaphragm 40 serves as one wall of a chamber which is otherwise completely enclosed by a cap 41, which chamber is filled with a viscous fluid 42. The operation of the device is the same as that previously described, except that during the nutation of the diaphragm, the fluid 42 is forced from one side of the chamber to the other, and its internal friction becomes the damping factor. In such case, the diaphragm 40 need not be itself of a damping character, although it will be obvious that the total damping is equal to the effect of the fluid and the diaphragm.

Figures 7, 8:
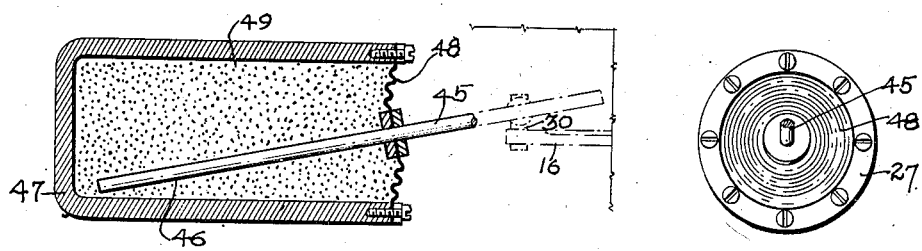
Fig. 7 is a view similar to Fig. 5 of a further modification.
Fig. 8 is an end elevation of the construction of Fig. 7.

The form of the invention disclosed in Fig. 7 is a further modification in which, all the other parts being the same, the rod 45 corresponding to the rod 28 of the first embodiment extends through the diaphragm, as shown at 46, and the cap 47 corresponding to the cap 41 of Fig. 5 is made deeper to permit the nutation of the extension 46 within it. This cap 47 is closed by the diaphragm 48, as in the previous modification, to form a chamber which is filled with a viscous fluid 49. In this instance, the damping action is due to the stirring of the viscous fluid by the rod 46.

All these embodiments of the invention are capable of adjustment by the screw 20 during the operation of the device.

Figures 3, 4:
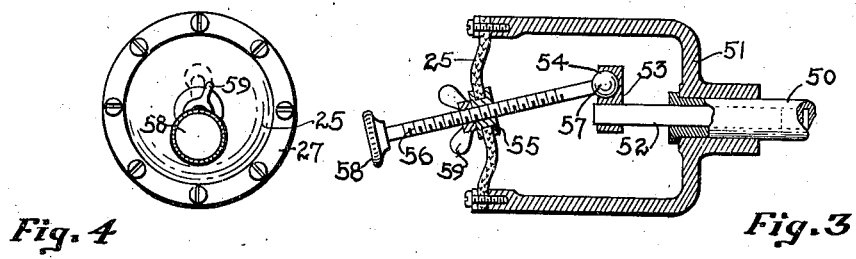
Fig. 3 is a central section of a modified form of device.
Fig. 4 is an end view thereof.

In Fig. 3 a somewhat simplified construction is provided in which the driving shaft 50 is journaled in a frame 51 and has concentrically splined therein a shaft 52 which carries the arm 53, which is provided with the ball socket 54. The diaphragm 25, which is of the internal friction type used in the first embodiment, has at its central portion a threaded sleeve 55, in which there is fitted a screw 56 which carries at its inner end the ball 57 cooperating with the ball socket 54 and having at its outer end a knurled handle 58 by which it may be turned. The butterfly nut 59 is used to lock it in its adjusted position.

The operation of this device is similar to that of Fig. 1, except that the longitudinal position of the shaft 52 is determined by loosening the wing nut 59 and turning the screw 58, and thereupon locking the wing nut in place again. This gives adjustment of the same type as that provided in Fig. 1, except that it cannot be conveniently accomplished while the device is in motion.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A device of the character described, comprising a flexible diaphragm, means for holding the periphery of the diaphragm in a plane perpendicular to an axis, means attached to the center of the diaphragm for bending the axis of the center portion at an angle to the axis of the periphery, said diaphragm being constructed and arranged to offer substantial resistance to said distortion, and means including a driving shaft for nutating the axis of the central portion about the axis of the periphery, the means for bending the axis of the center comprising a rod attached to the center of the diaphragm, a shaft concentric with the axis of the periphery of the diaphragm, a bearing carried by and eccentric to said shaft for engaging said rod, and means for varying the position of said bearing to vary the degree of bending of said axis.

2. A device of the character described, including a frame, a shaft carried by said frame, a second shaft mounted in said frame for endwise and rotary movement parallel to said first mentioned shaft, means for driving said sliding shaft by said first mentioned shaft, a diaphragm having its periphery supported concentric to said sliding shaft, a rod attached to the center of said diaphragm and an eccentric bearing on said sliding shaft for engaging said rod, and means for effecting an endwise movement of said sliding shaft.

3. A device in accordance with claim 2, in which the diaphragm is composed of a material having a high internal coefficient of resistance.

4. A device in accordance with claim 2, in which said diaphragm forms one wall of a closed chamber which is completely filled with a viscous material.

5. A device in accordance with claim 2, in which said diaphragm forms one wall of a chamber which is completely filled with a viscous material and having a rod attached to said diaphragm at its central portion extending within said material.

6. A device of the character described, comprising a chamber, a shaft journaled within said chamber for sliding and rotary motion, a drive shaft for imparting a rotary motion to said sliding shaft, a flexible diaphragm having its periphery supported concentric to said sliding shaft, a rod extending from the center of said diaphragm and secured thereto against bending motion relative to said center, a bearing carried by said sliding shaft eccentric to the axis thereof and engaging said rod, and means for varying the effective length of said rod between said diaphragm and said bearing.

FRANK RIEBER.

REFERENCES CITED

The following references are of record in the file of this patent:

UNITED STATES PATENTS

| Number | Name | Date |
| --- | --- | --- |
| 584,599 | Pain et al. | June 15, 1897 |
| 692,978 | Braun | Feb. 11, 1902 |
| 2,042,510 | Cornelius et al. | June 2, 1936 |
| 2,065,834 | Swennes | Dec. 29, 1936 |
| 2,107,090 | Swennes | Feb. 1, 1938 |
| 2,117,563 | McMillan | May 17, 1938 |
| 2,240,371 | Linch et al. | Apr. 29, 1941 |

FOREIGN PATENTS

| Number | Country | Date |
| --- | --- | --- |
| 242,804 | Germany | Jan. 20, 1912 |